(12) United States Patent
Yoda et al.

(10) Patent No.: US 6,256,171 B1
(45) Date of Patent: *Jul. 3, 2001

(54) THIN FILM MAGNETIC HEAD HAVING AN IMPROVED HEAT DISPERSION AND MAGNETIC RECORDING APPARATUS USING THE SAME

(75) Inventors: Hiroaki Yoda; Akio Hori, both of Kawasaki; Yuichi Ohsawa, Tokyo; Masashi Sahashi, Yokohama; Masatoshi Yoshikawa, Yokohama; Miki Mori, Yokohama, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/937,183

(22) Filed: Sep. 29, 1997

(30) Foreign Application Priority Data

Sep. 30, 1996 (JP) ...................................... 8-259530

(51) Int. Cl.⁷ ............................... G11B 5/39; G11B 5/31; G11B 21/21

(52) U.S. Cl. ......................................................... 360/235.3

(58) Field of Search .................................... 360/104, 113, 360/122, 127, 128, 129, 235.1, 235.3

(56) References Cited

U.S. PATENT DOCUMENTS

| | | | |
|---|---|---|---|
| 4,068,272 | 1/1978 | Kanai et al. | 360/113 |
| 4,300,177 | 11/1981 | Koel et al. | 360/113 |
| 4,343,026 | 8/1982 | Griffith et al. | 360/113 |

FOREIGN PATENT DOCUMENTS

| | | |
|---|---|---|
| 25 36 931 | 3/1976 | (DE) . |
| 0 220 385 | 5/1987 | (EP) . |
| 0 262 925 | 4/1988 | (EP) . |

(List continued on next page.)

OTHER PUBLICATIONS

Kazuhiko Yamada et al., Fabrication Process For High Track Density Yoke MR Heads, IEEE Transactions on Magnetics, vol. 26, No. 5, Sep. 1990, pp. 2406–2408.

Shibaya, H., History of Thin Alloy Film for Magnetic Recording Head Aiming at High Density and Wide Band Recording, IEEE Transl. Journal on Magnetics in Japan, 3 (1988) May, No. 5, New York, U.S.A., pp. 309–406.

Primary Examiner—David Davis

(57) ABSTRACT

A thin film magnetic head has a reproducing element or/and recording element which is held from the direction of its thickness between a first ceramic substrate and a second ceramic substrate. The reproducing element or/and recording element is positioned at substantially the center with respect to the direction of track width. The first and second ceramic substrates hold the reproducing element or/and recording element from, for example, the direction of track width. The reproducing element or/and recording element is provided with a yoke type reproducing part which has at least one pair of magnetic cores with a magnetic gap therebetween on the side of a medium opposed face and a magnetoresistance effect element to which a signal magnetic flux from a magnetic recording medium is led through the pair of magnetic cores. Heat due to a sense current and heat due to the contact between the reproducing element or/and recording element and the magnetic recording medium are efficiently dissipated to the first and second ceramic substrates, thereby retarding a temperature increase of the reproducing element or/and recording element. Abrasion in the neighborhood of the reproducing element or/and recording element is retarded by the first and second ceramic substrates. A magnetic recording apparatus is provided with a magnetic recording medium, and a magnetic head slider having the thin film magnetic head described above.

54 Claims, 9 Drawing Sheets

U.S. PATENT DOCUMENTS

| | | |
|---|---|---|
| 4,356,523 | 10/1982 | Yeh ................................... 360/113 |
| 4,388,662 | 6/1983 | Jeffers et al. ..................... 360/113 |
| 4,644,430 | 2/1987 | French .............................. 360/113 |
| 4,652,945 | 3/1987 | Marchant ....................... 360/113 X |
| 4,698,711 | 10/1987 | Vinal ................................. 360/113 |
| 4,814,920 * | 3/1989 | Yamano et al. .................. 360/104 |
| 4,954,920 | 9/1990 | Yamada et al. .................. 360/113 |
| 5,079,662 | 1/1992 | Kawakami et al. .............. 360/113 |
| 5,095,397 | 3/1992 | Nagata et al. .................... 360/113 |
| 5,184,393 * | 2/1993 | Saito et al. ....................... 360/122 |
| 5,255,141 | 10/1993 | Valstyn et al. ................... 360/113 |
| 5,331,492 | 7/1994 | Komai et al. ..................... 360/113 |
| 5,486,967 | 1/1996 | Tanaka et al. .................... 360/113 |
| 5,493,467 | 2/1996 | Cain et al. ........................ 360/113 |
| 5,717,551 * | 2/1998 | Negishi et al. ................... 360/122 |
| 5,726,841 * | 3/1998 | Tong et al. ....................... 360/122 |
| 5,844,749 * | 12/1998 | Sakai et al. ...................... 360/103 |
| 6,040,965 * | 3/2000 | Terunuma et al. ............... 360/122 |

FOREIGN PATENT DOCUMENTS

| | | |
|---|---|---|
| 0 269 129 | 6/1988 | (EP) . |
| 0 490 327 | 6/1992 | (EP) . |
| 53-49415 | 5/1978 | (JP) . |
| 58-12125 | 1/1983 | (JP) . |
| 58-100215 | 6/1983 | (JP) . |
| 57-40709 * | 3/1986 | (JP) . |
| 62-71016 | 4/1987 | (JP) . |
| 62-86521 | 4/1987 | (JP) . |
| 62-172515 | 7/1987 | (JP) . |
| 62-266720 | 11/1987 | (JP) . |
| 63-224016 | 9/1988 | (JP) . |
| 1-217718 | 8/1989 | (JP) . |
| 2-105315 | 4/1990 | (JP) . |
| 58-1831 | 1/1993 | (JP) . |
| 5-54340 | 3/1993 | (JP) . |
| 5-242433 | 9/1993 | (JP) . |
| 6-162437 | 6/1994 | (JP) . |
| 8-138215 | 5/1996 | (JP) . |

* cited by examiner

THIN FILM MAGNETIC HEAD HAVING AN IMPROVED HEAT DISPERSION AND MAGNETIC RECORDING APPARATUS USING THE SAME

BACKGROUND OF THE INVENTION

1. Field of the Invention

The invention relates to a thin film magnetic head and a magnetic recording apparatus such as a magnetic disk drive, and more particularly to a thin film magnetic head having a small flying height just above a magnetic recording medium and to a magnetic recording apparatus.

2. Description of the Related Art

A magnetic hard disk drive (HDD) has a magnetic head (slider) 1 with a thin film magnetic head as shown in FIG. 12. The magnetic head (slider) 1 shown in FIG. 12 has an $Al_2O_3$.TiC substrate 2 with an insulation layer of an $AlO_x$ film 3 disposed on its main surface.

Slider parts 4 are disposed on both sides of the $Al_2O_3$.TiC substrate 2 at a medium opposed face side. The medium opposed face of the slider part 4 is called an ABS (Air Bearing Surface) by which the magnetic head slider 1 flies above a magnetic disk. A reproducing element or/and recording element 5 (transferring element) is disposed inside the $AlO_x$ film 3. The reproducing element or/and recording element 5 is a so-called thin film magnetic head that transfer information to and/or from the magnetic disk. Reference numeral 6 in FIG. 12 denotes a coil for supplying a recording magnetic field to the reproducing element or/and recording element 5. The reproducing element or/and recording element 5 is disposed in one of the slider parts 4 in view of the direction in which a medium is running and a production process thereof.

The magnetic recording apparatus such as HDD is highly demanded to record information in a high density. To achieve the high recording density, techniques for providing a narrow track width and a short gap are essential. For example, a HDD having a recording density of 200 $Mb/inch^2$ (bpsi) has a recording track width of 7 µm and a track pitch and a track width tolerance of about 2 µm. To have a recording density of 1 Gbpsi or more, particularly 5 Gbpsi or more, it is demanded to have a recording track width of 3 to 5 µm or below and a track width tolerance of 0.5 µm or below.

With a higher density of recorded information, a signal magnetic flux quantity is lowered. For a compensate of the lowered signal magnetic flux quantity, it is necessary to decrease a flying height of the magnetic head above the magnetic recording medium. The flying height of the conventional magnetic head changes to 100 nm or below. Especially, the flying height of the magnetic head is required to be 50 nm or below when a recording density is 1 Gbpsi or more, and 20 nm or below when it is 5 Gbpsi or more.

For a reproducing head, a magnetic head (MR head) to which a high sensitive magnetoresistance effect element (MR element) is applied is being used to compensate the lowered reproducing output due to the reduction of recording track width. FIG. 13 shows the structure of a shield type MR head to be used as a reproducing potion of the reproducing element or/and recording element 5.

A lower magnetic shield layer 11 made of Permalloy or the like is formed on the main surface of the $Al_2O_3$.TiC substrate 2 through an $AlO_x$ film 3'. The $Al_2O_3$.TiC substrate 2 is a substrate configuring the magnetic head slider 1. A magnetoresistance effect film (MR film) 13 is formed on the lower magnetic shield layer 11 through a nonmagnetic insulation film 12 configuring a reproducing magnetic gap. An MR element 14 comprises the MR film 13 and a pair of leads 15 connected to both ends of the MR film 13.

An upper magnetic shield layer 17 is disposed on the MR element 14 through a nonmagnetic insulation film 16 configuring a reproducing magnetic gap. Thus, the shield type MR head is configured as the reproducing potion. To detect a signal magnetic field by the shield type MR head, a sense current is fed through the pair of leads 15 and the element resistance of the MR film 13 is measured.

A recording part of the reproducing element or/and recording element 5 is formed following the upper magnetic shield layer 17. The recording part has a pair of upper and lower magnetic poles (not shown) which form a magnetic circuit through a recording magnetic gap. The coil 6 produces a recording magnetic field between the pair of magnetic poles. An insulation protective film such as an $AlO_x$ film is formed on the recording part. This insulation protective film forms a part of the $AlO_x$ film 2.

A HDD which uses an ABS to fly the magnetic head slider 1 above the magnetic disk does not seem to have a problem that the magnetic head slider 1 comes in contact with the magnetic disk. However, contact between the reproducing element or/and recording element 5 and the recording medium occurs due to surface roughness, which are called a glide height, formed on the surface of a recording medium. This contact becomes conspicuous as the flying height of the magnetic head slider 1 is made small. The contact between the reproducing element or/and recording element 5 and the recording medium induces a local temperature rise on the MR film 13. When the temperature of the MR film 13 rises, a reproducing voltage output level is varied, and a readout error which is designated as thermal asperity occurs.

In addition, the reproducing part using the MR element 14 has a temperature increase of about 40° C. due to a sense current (up to 5 mA) for measuring a resistance change. At an ambient temperature of 80° C., the temperature of the MR element 14 rises to about 120 to 130° C. This temperature increase of the MR element 14 results in interface diffusion of the MR film 13 and property deterioration of the magnetic layer forming it in the long view.

When the flying height of the magnetic head slider 1 is determined to be about 20 nm or below which is a smoothing limit of the recording medium, a contact probability between the reproducing element or/and recording element 5 and the recording medium is dramatically increased. Also, the disposition of the reproducing element or/and recording element 5 on one side of the magnetic head slider 1 is a cause of increasing the contact probability between the reproducing element or/and recording element 5 and the recording medium. Thus, the magnetic head and the magnetic recording medium are contacted in a broad area including the neighborhood of the MR film 13.

And, deviated abrasion is caused when the $AlO_x$ film 2 or the like having small hardness is exposed to the medium opposed face of the magnetic head contacting in a large area. The deviated abrasion of the medium opposed face increases a space between the magnetic head and the recording medium, resulting in degrading the recording resolution and reproducing resolution. If wear is substantial, the component materials positioned inward of the medium opposed face are exposed sequentially. Particles of a lubricating layer of the recording medium are adsorbed, also causing abrasion of the lubricating layer. The magnetic head slider 1, which has the reproducing element or/and recording element 5 disposed on one side, also has a disadvantage that trace precision of the recording tracks tends to be lowered when the recording density is made high.

For a head structure which does not involve a direct contact between the MR film and the recording medium, there is proposed a yoke type MR head which flows a signal magnetic field to the MR film through the magnetic yoke (see JP-A-08-138,215). For example, the yoke type MR head has a pair of magnetic cores which become the magnetic yoke disposed on an $Al_2O_3$.TiC substrate through an insulation film. The pair of magnetic cores are disposed through a magnetic gap so to form the same plane. And, the MR element is disposed on this flat type magnetic yoke. The coil of the recording part is formed to have the magnetic yoke made of a pair of magnetic poles.

The magnetic head slider using the yoke type MR head has the width of ABS of the slider part having the reproducing element or/and recording element determined to be narrower than the width of ABS of the other slider part. And, the flying height of the slider part having the reproducing element or/and recording element is determined to be smaller than that of the other slider part. Thus, the leading end of the reproducing element nearly or/and recording element comes into contact with the recording medium.

A magnetic head slider using the yoke type MR head described above has a possibility of causing the same disadvantage as the magnetic head slider using the shield type MR head. Besides, since the yoke type MR head has the pair of magnetic cores disposed in a horizontal direction, the reproducing element or/and recording element exposed to the medium opposed face is thinner than the shield type MR head. The MR film has a disadvantage that reproducing element or/and recording element is worn more easily though the MR film is not directly exposed to the medium opposed face.

As described above, when the magnetic head slider is flying slightly while running, the reproducing element or/and recording element which is exposed to the medium opposed face produces heat due to the contact with the recording medium, inducing a thermal asperity. Properties are also degraded by the temperature increase due to the sense current supplied to the MR film. Therefore, it is highly demanded to improve heat dispersion in the neighborhood of the reproducing element or/and recording element including the MR film.

Besides, if the flying height of the magnetic head slider lowers to the smoothing limit or below of the recording medium, wear occurs in a wide area in the neighborhood of the reproducing element or/and recording element, and recording and reproducing resolution is degraded. If wear is substantial, the lubricating layer of the recording medium is also worn. Therefore, it is desired that wear in the neighborhood of the reproducing element or/and recording element is retarded when the magnetic head slider is being slightly while running.

The magnetic head slider having the reproducing element or/and recording element disposed on one side is a cause of increasing a contact probability between the reproducing element or/and recording element and the recording medium. Furthermore, when the recording density is highly increased, trace precision of the recording tracks is degraded. Under the circumstances, a technique for providing a stable running of the magnetic head slider is demanded.

SUMMARY OF THE INVENTION

An object of the invention, therefore, is to provide a thin film magnetic head with heat dispersion in the neighborhood of a reproducing element or/and recording element (transfering element) improved to retard the degradation of properties of the reproducing element or/and recording element involved in the production of a thermal asperity or a temperature increase, and to provide a magnetic recording apparatus using it. Another object of the invention is to provide a thin film magnetic head which can retard the wear in the neighborhood of a reproducing element or/and recording element to retard the degradation of recording and reproducing resolution and the wear of a lubricating layer of a recording medium, and to provide a magnetic recording apparatus using it. Still another object of the invention is to provide a thin film magnetic head which has a head slider improved to run stably, and to provide a magnetic recording apparatus using it.

A first thin film magnetic head of the invention comprises a first ceramic substrate; a second ceramic substrate; and a reproducing element or/and recording element which is held between the first ceramic substrate and the second ceramic substrate from its thickness direction so to position at substantially the center of the thin film magnetic head with respect to the direction of track width.

A second thin film magnetic head of the invention comprises a first ceramic substrate; a second ceramic substrate; and a reproducing element or/and recording element which is held between the first ceramic substrate and the second ceramic substrate from substantially the direction of track width.

A third thin film magnetic head of the invention comprises a reproducing element or/and recording element which has at least one pair of magnetic cores with a magnetic gap therebetween formed on the side of a medium opposed face and a magnetoresistance effect element to which a signal magnetic flux is lead from a recording medium through the pair of magnetic cores; and first and second ceramic substrates which hold the reproducing element or/and recording element from its thickness direction.

In the thin film magnetic head of the invention, the reproducing element or/and recording element is held between the first and second ceramic substrates. Therefore, even if the reproducing element or/and recording element or the like comes into contact with the surface roughness of the recording medium to raise a temperature, heat can be dissipated efficiently to the first and second ceramic substrates. Thus, occurrence of a thermal asperity can be reduced. A temperature increase of the reproducing element or/and recording element owing to a sense current can also be retarded. Besides, wear due to the contact between the reproducing element or/and recording element and the recording medium is retarded by the first and second ceramic substrates holding the reproducing element or/and recording element therebetween.

By disposing the reproducing element or/and recording element at substantially the center of the thin film magnetic head, running stability is improved. Therefore, wear due to the contact with the recording medium can be reduced, and disadvantages, that a space between the thin film magnetic head and the magnetic recording medium is increased and the recording and reproducing resolution is degraded, can be remedied. Thus, good properties can be obtained even when a flying height of the magnetic head is 100 nm or below.

The magnetic recording apparatus of the invention is provided with the magnetic head slider having the thin film magnetic head of the invention described above.

A first magnetic recording apparatus of the invention comprises a magnetic recording medium; and a magnetic head slider having a thin film magnetic head which includes: a first ceramic substrate; a second ceramic substrate; and a recording element which writes signals in the magnetic recording medium by a magnetic field, and which is held between the first ceramic substrate and the second ceramic substrate from its thickness direction so to position at substantially the center with respect to the direction of track width of the magnetic recording medium.

A second magnetic recording apparatus of the invention comprises a magnetic recording medium; and a magnetic head slider having a thin film magnetic head which includes: a first ceramic substrate; a second ceramic substrate; and a recording element which writes signals in the magnetic recording medium by a magnetic field, and which is held between the first ceramic substrate and the second ceramic substrate from the direction of track width of the magnetic recording medium.

A magnetic recording/reproducing apparatus of the invention comprises a magnetic recording medium; and a magnetic head slider having a thin film magnetic head which includes: a recording element which writes signals in the magnetic recording medium by a magnetic field or reproducing element which reads signals from the magnetic recording medium with reference to a magnetic field, and has at least one pair of magnetic cores with a magnetic gap therebetween formed on the side of a medium opposed face and a magnetoresistance effect element for deriving a signal magnetic flux from the magnetic recording medium through the pair of magnetic cores; and first and second ceramic substrates which hold the reproducing element or/and recording element from its thickness direction.

DESCRIPTION OF THE PREFERRED EMBODIMENTS

Embodiments of the invention will be described with reference to the accompanying drawings.

Figure 1:
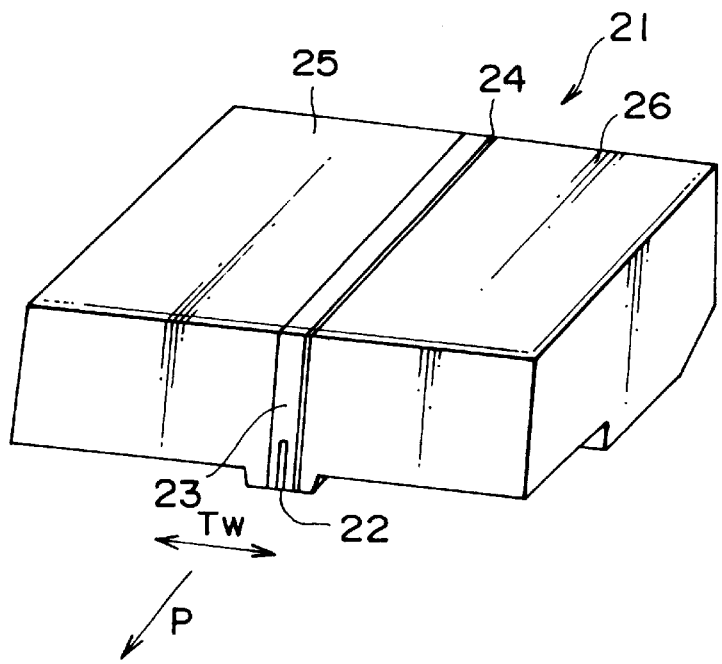
FIG. 1 is a perspective view showing schematically a structure of the magnetic head (slider) according to a first embodiment of the invention.

FIG. 1 is a perspective view schematically showing the structure of a first embodiment of a magnetic head (slider) to which the thin film magnetic head according to the invention is applied. A magnetic head (slider) 21 shown in FIG. 1 has a reproducing element or/and recording element 22 (transfering element), which includes a recording part and a reproducing part, at substantially the center thereof in the direction of track width. The reproducing element or/and recording element 22 is disposed within an insulation layer 23 which is made of $AlO_x$ ($1 \leq x \leq 1.5$) and the like. The reproducing element or/and recording element 22 has an exposed face to oppose a medium (the bottom face of the magnetic head slider 21 in FIG. 1). As the medium circulates, the head (slider) 21 flies above the medium with its proceeding direction P.

Figure 2:
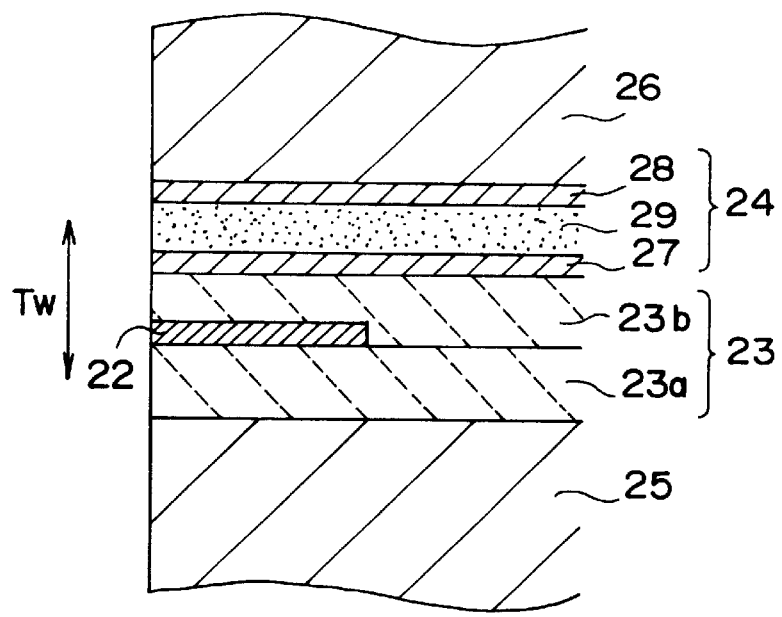
FIG. 2 is a sectional view of the magnetic head slider shown in FIG. 1 showing the neighborhood of the reproducing element or/and recording element viewed from the side of a medium opposing face.

The reproducing element or/and recording element 22 disposed within the insulation layer 23 is held in the direction of its thickness between a first ceramic substrate 25 and a second ceramic substrate 26 through a bonding layer 24 which is disposed on one side face of the insulation layer 23. The first and second ceramic substrates 25, 26 are disposed so that their laminated direction becomes parallel to the direction Tw of the recording track width. In other words, the first and second ceramic substrates 25, 26 hold the reproducing element or/and recording element 22 disposed within the insulation layer 23 from the direction of recording track width. The reproducing element or/and recording element 22 is preferably positioned at substantially the center in the direction of track width by being held between the first and second ceramic substrates 25, 26. FIG. 2 is a sectional view of the magnetic head 21 showing the neighborhood of the reproducing element or/and recording element 22 viewed from the side of the medium opposing face. Referring to FIG. 2, a position where the reproducing element or/and recording element 22 is formed will be described in detail. The first ceramic substrate 25 has an insulating $AlO_x$ film 23a and the like formed on its main surface. The reproducing element or/and recording element 22 is formed on the $AlO_x$ film 23a and covered with a protective insulation layer, $AlO_x$ film 23b. The reproducing element or/and recording element 22 is disposed within the insulation layer 23 which is formed of the AlO films 23a, 23b.

The first ceramic substrate 25 on which the reproducing element or/and recording element 22 is bonded to the second ceramic substrate 26 through the bonding layer 24. The bonding faces of the first and second ceramic substrates 25, 26 have bonding base films 27, 28 disposed thereon, respectively. An adhesive layer 29 formed of water glass, low-melting glass or the like is placed between the bonding base films 27, 28 to bond the first ceramic substrate 25 and the second ceramic substrate 26. An insulation layer such as an $AlO_x$ film is also disposed on the bonding face of the second ceramic substrate 26 as required.

The adhesive layer 29 is not limited to the water glass, low-melting glass or the like but may be made of inert metal such as Au, Pt, Ag, Cu, Ni, Ir or Co. The first ceramic substrate 25 can be bonded with the second ceramic substrate 26 by forming a thin film of inert metal on the bonding base films 27, 28 of the respective ceramic substrates 25, 26 and thermally treating the joined inert metal thin films. The adhesive layer 29 is preferably made of a metallic material in view of heat dispersion toward the second ceramic substrate 26. A bonding method will be described in detail afterwards.

In a magnetic head 1 shown in FIG. 1 and FIG. 2, a medium opposed face (ABS) in the neighborhood of the reproducing element or/and recording element 22 exposes the reproducing element or/and recording element 22, the insulation layer 23, the bonding layer 24 and the first and second ceramic substrates 25, 26. The insulation layer 23 may be diamond-like carbon. The diamond-like carbon serves to improve the heat dispersion in the neighborhood of the reproducing element or/and recording element 22 and to further increase hardness.

In order to enhance the heat dispersion in the neighborhood of the reproducing element or/and recording element 22, the first and second ceramic substrates 25, 26 are preferably formed of a substrate material having a thermal conductivity higher than that of film alumina ($AlO_x$), and more specifically a thermal conductivity of 10 W/mK or more. The ceramic substrate having such a thermal conductivity includes an $Al_2O_3$.TiC substrate (a thermal conductivity of 20 to 50 W/mK), an SiC substrate (a thermal conductivity of 270 W/mK), an AlN substrate (a thermal conductivity of 100 to 250 W/mK), an $Si_3N_4$ substrate (a thermal conductivity of 50 to 100 W/mK), an Ni—Zn ferrite substrate (a thermal conductivity of 30 W/mK), an $Al_2O_3$ substrate (a thermal conductivity of 10 to 30 W/mK) and the like. The first and second ceramic substrates 25, 26 preferably have a thermal conductivity of 20 W/mK or more.

On the other hand, the first and second ceramic substrates 25, 26 are desired to be a ceramic substrate having a high hardness from the viewpoint of retarding abrasion in the neighborhood of the reproducing element or/and recording element 22. Specifically, it is desirable to use a ceramic substrate having a Vickers hardness of 800 Hv or more. Such a ceramic substrate includes an $Al_2O_3$.TiC substrate (a Vickers hardness of 2000 to 2500 Hv), an SiC substrate (a Vickers hardness of 2000 to 3000 Hv), an $Si_3N_4$ substrate (a Vickers hardness of 1200 to 1900 Hv), an Ni—Zn ferrite substrate (a Vickers hardness of 800 Hv), an $Al_2O_3$ substrate (a Vickers hardness of 2000 to 2100 Hv), a $ZrO_2$ substrate (a Vickers hardness of 1200 to 1600 Hv) and the like.

Both the first and second ceramic substrates 25, 26 may be formed of the same material or a different material. For example, the first ceramic substrate 25 can be a ceramic substrate having a high hardness, while the second ceramic substrate 26 can be a ceramic substrate having a high thermal conductivity.

A reproducing part of the reproducing element or/and recording element 22 is preferably an MR element which can produce a high output. The reproducing element or/and recording element 22 having the MR element applied to its reproducing part includes, for example, a yoke type recording/reproducing part which integrates a recording part with a reproducing part, and a shield type recording/reproducing part which separately has a recording part and a reproducing part. Especially, a flat yoke type recording/reproducing part as shown in FIG. 3 is preferably used.

Figure 3:
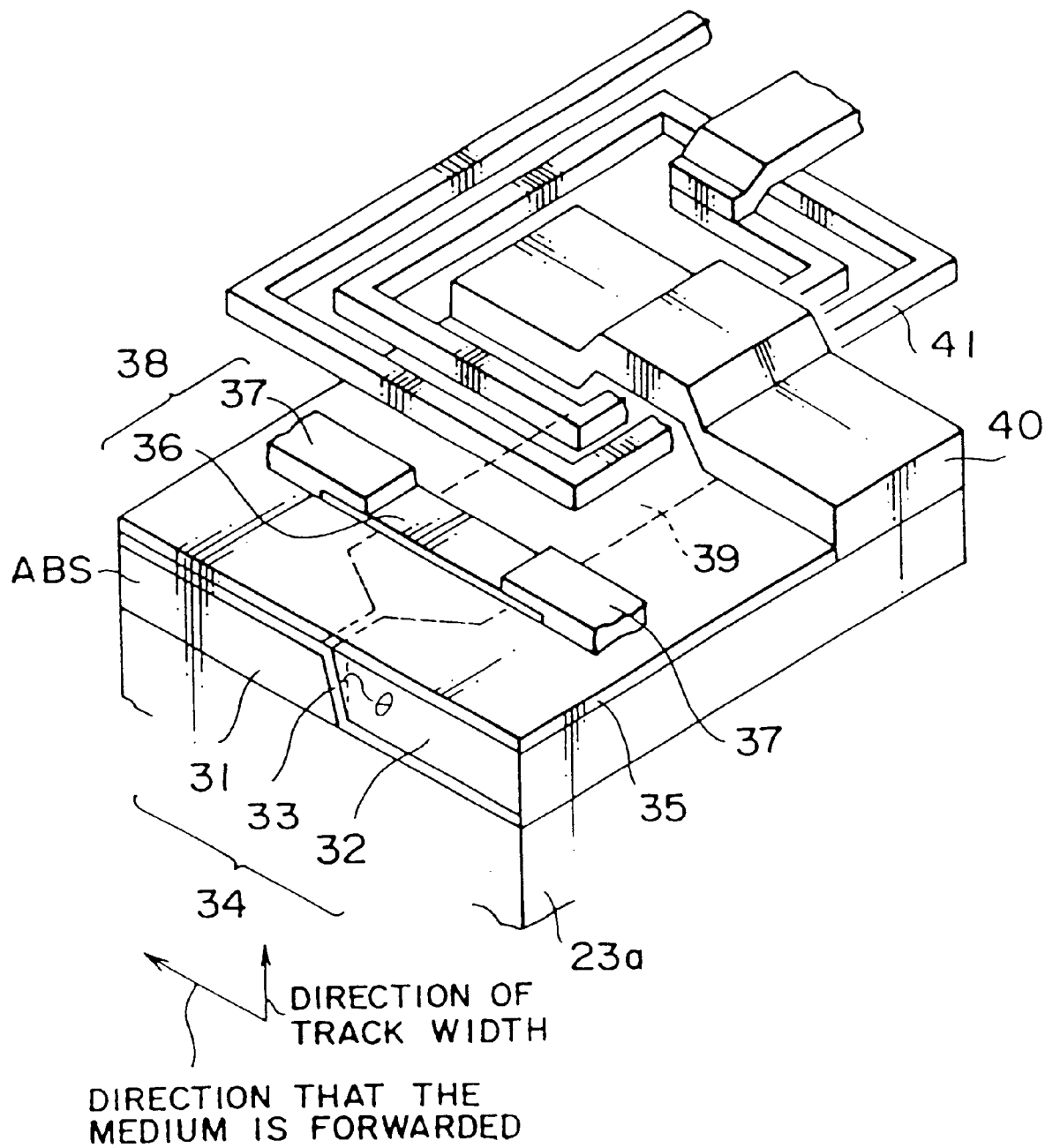
FIG. 3 is a perspective view showing the structure of a flat yoke type recording/reproducing element applied to the magnetic head (slider) shown in FIG. 1.

In the flat yoke type recording/reproducing part as shown in FIG. 3, a pair of magnetic cores (magnetic layer) 31, 32 are formed on the $AlO_x$ film 23a which is on the first ceramic substrate (not shown in FIG. 3). The pair of magnetic cores 31, 32 are in a parallel arrangement so that their main surfaces are substantially parallel to the surface of the $AlO_x$ film 23a. And, the magnetic cores 31, 32 have a thickness substantially equal to the track width. A magnetic gap 33 is intervened between the pair of magnetic cores 31, 32 and on the side of the medium opposed face (ABS), thereby forming a flat type magnetic yoke 34. In the configuration shown in FIG. 3, the magnetic gap 33 is formed at an angle θ in the direction that the medium is forwarded with respect to the direction of track width (application of an azimuth angle). The angle θ is given to prevent effectively a cross talk with the neighboring track, as required.

An MR film 36 is formed on the pair of magnetic cores 31, 32 through an insulation film 35. The MR film 36 is disposed away from the medium opposed face (ABS) into the head and has on its both ends a pair of electrodes 37 which supply the MR film 36 with a sense current. The MR film 36 and the pair of electrodes 37 form an MR element 38. Only the flat type magnetic yoke 34 which comprises the pair of magnetic cores 31, 32 with the magnetic gap 33 therebetween is exposed to the medium opposed face (ABS).

The MR film 36 has a laminated structure of, for example, an anisotropic magnetoresistance effect film (AMR film) which has a variable electric resistance depending on an angle formed by a current direction and a magnetization moment of a magnetic layer, the magnetic layer, and a non-magnetic layer. And, there is used a giant magnetoresistance effect film (GMR) such as a spin valve film or an artificial lattice film which has a variable electric resistance depending on an angle formed by magnetization of the respective magnetic layers. Materials for the AMR film include $Ni_{80}Fe_{20}$ and the like. The spin valve film can be a $Co_{90}Fe_{10}/Cu/Co_{90}Fe_{10}$ laminated film or the like. The spin valve film has an antiferromagnetic film formed of FeMn, IrMn or the like disposed next to the $Co_{90}Fe_{10}$ film (ferromagnetic film) on one side and magnetization of the other $Co_{90}Fe_{10}$ film fixed.

A back core 40, which is magnetically connected to the pair of magnetic cores 31, 32 with the insulation film 35 partly removed, is formed on the backside, namely over a back gap 39, of the flat type magnetic yoke 34 when viewed from the medium opposed face (ABS), thereby forming a recording magnetic loop. A recording coil 41 is wound flat to cross the recording magnetic loop. A recording medium is scanned in a direction to cross the magnetic cores 31, 32. The track width corresponds to a thickness of the magnetic cores 31, 32, and a recording and reproducing bit length corresponds to a width of the gap 33.

Figure 4:
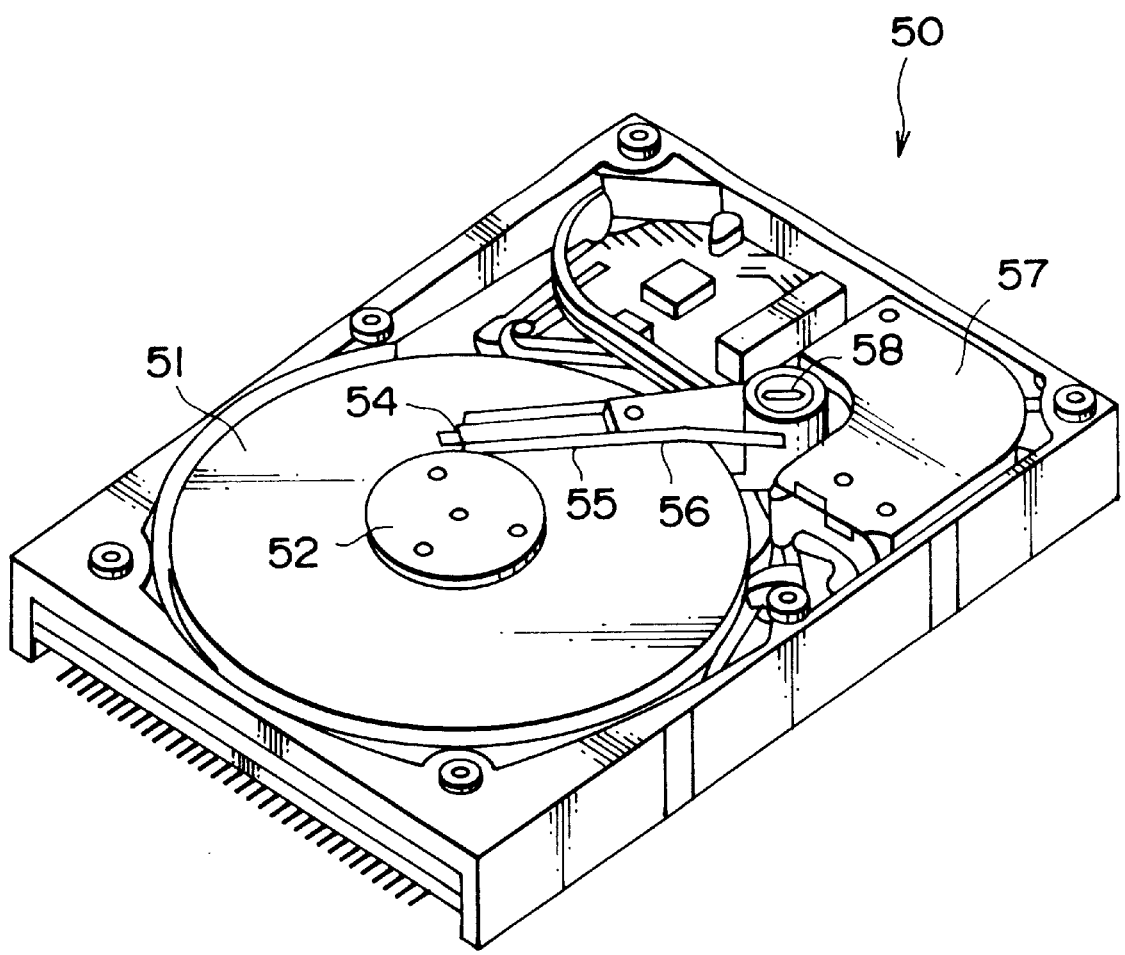
FIG. 4 is a perspective view showing a structure of the magnetic disk drive according to one embodiment of the invention.
Figure 5:
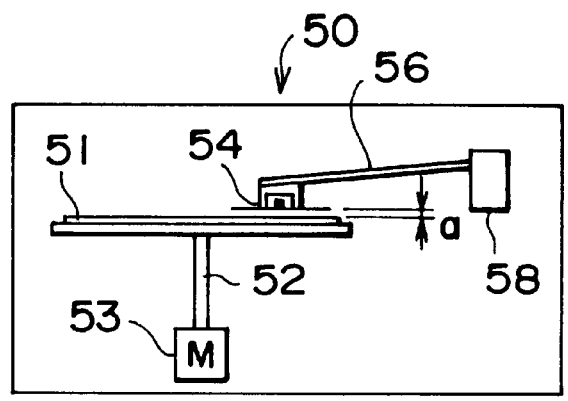
FIG. 5 is a side view schematically showing a structure of the magnetic disk drive shown in FIG. 4.

The magnetic head (slider) 21 described above is mounted on a magnetic recording apparatus such as the magnetic disk drive shown in FIG. 4 and FIG. 5. FIG. 4 and FIG. 5 show a schematic structure of a magnetic disk drive 50 using a rotary actuator.

A magnetic disk 51 is mounted on a spindle 52 and rotated by a motor 53 which responds to a control signal from a drive unit control source (not shown). A head (slider) 54, which has the reproducing element or/and recording element for recording and reproducing information in a state flying above the magnetic disk 51, is attached to the leading end of a thin film suspension 55. When the magnetic disk 51 rotates, the medium opposed face (ABS) of the head (slider) 54 is kept at a predetermined flying height (0 to 100 nm or below) above the surface of the magnetic disk 51.

Figure 6:
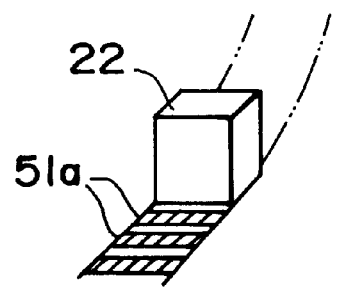
FIG. 6 is a diagram showing the positional relationship between a magnetic head (slider) and a recording track of the magnetic disk drive shown in FIG. 4.

The head slider 54 is formed of the magnetic head (slider) 21 of the embodiment described above, and has the reproducing element or/and recording element 22 (not shown in FIG. 4 and FIG. 5) such as the flat yoke type recording/reproducing part described above. The head (slider) 54 is disposed to have the laminated direction of the first and second ceramic substrates 25, 26 be substantially orthogonal to the rotating direction of the magnetic disk 51. FIG. 6 shows the relative positional relationship between recording tracks 51a of the magnetic disk 51 and the reproducing element or/and recording element 22 of the head slider 54.

The suspension 55 is connected to one end of an actuator arm 56 which has a bobbin or the like to hold a drive coil (not shown), and one type of a linear motor, voice coil motor 57, is disposed on the other end of the actuator arm 56. The voice coil motor 57 comprises a drive coil (not shown) wound around the bobbin of the actuator arm 56, and a magnetic circuit which is formed of a permanent magnet opposed to catch the drive coil and an opposed yoke. The actuator arm 56 is held by ball bearings placed at upper and lower positions of a stationary shaft 58 and freely slid by the voice coil motor 57.

Figure 12:
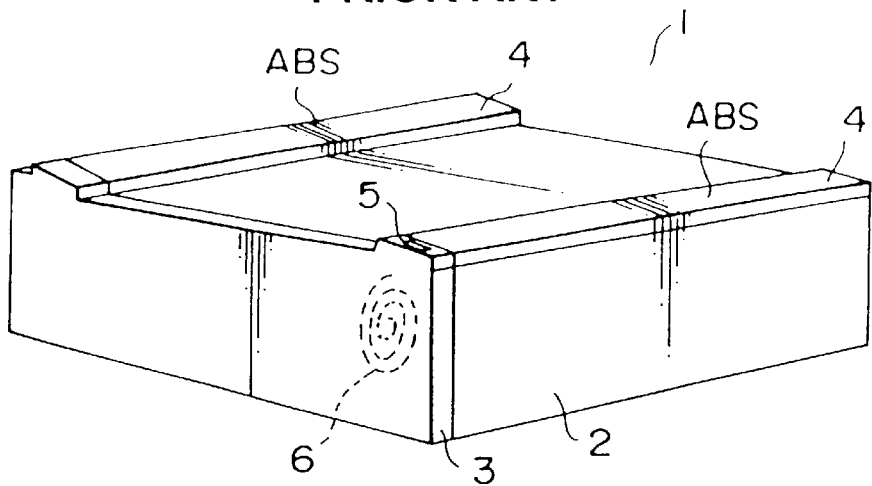
FIG. 12 is a perspective view showing one structural embodiment of a conventional magnetic head (slider)

The magnetic head (slider) 21 in the above embodiment has the reproducing element or/and recording element 22 held between the first and second ceramic substrates 25, 26 in the direction of its film thickness. Accordingly, heat generated upon contact between the recording medium such as the magnetic disk 51 and the reproducing element or/and recording element 22 can be dissipated to the first and second ceramic substrates 25, 26. In comparison with a conventional magnetic head slider having a substrate on only one side of a reproducing element or/and recording element shown in FIG. 12, a heat dissipating efficiency of about two times higher can be obtained. Especially, by using a ceramic substrate having a thermal conductivity of 10 W/mK or more, desirably 20 W/mK or more, for the first and second ceramic substrates 25, 26, the heat dissipating efficiency from the reproducing element or/and recording element 22 can be enhanced.

Thus, a temperature increase of the reproducing element or/and recording element 22 can be prevented by enhancing the heat dispersion in the neighborhood of the reproducing element or/and recording element 22 and improving the heat dissipating efficiency from the reproducing element or/and recording element 22. Even when the reproducing element or/and recording element 22 has a locally increased temperature due to the contact with glide height, on the surface of a recording medium, variance of a reproduction voltage output level which is called a thermal asperity is not caused, and the occurrence of read-out errors can be reduced. Improvement of heat dispersion in the neighborhood of the reproducing element or/and recording element 22 serves to prevent the temperature of the MR film 36 from rising due to a sense current. Thus, the properties of the magnetic layers forming the MR film 36 can also be prevented from being degraded.

On the medium opposed face (ABS) in the neighborhood of the reproducing element or/and recording element 22, the first and second ceramic substrates 25, 26 as well as the reproducing element or/and recording element 22 and the insulation layer 23 are exposed. If the reproducing element or/and recording element 22 comes in contact with a recording medium such as the magnetic disk 51, the reproducing element or/and recording element 22 which is easily abraded and the insulation layer 23 made of $AlO_x$ or the like are contacted with the recording medium, and the first and second ceramic substrates 25, 26 which are good in abrasion resistance are also contacted with the recording medium. Therefore, the reproducing element or/and recording element 22 and the insulation layer 23 can be retarded from being abraded. Especially, by using a ceramic substrate having a Vickers hardness of 800 Hv or more for the first and second ceramic substrates 25, 26, abrasion in the neighborhood of the reproducing element or/and recording element 22 can be retarded extensively.

Thus, a stable distance can be kept between the reproducing element or/and recording element 22 and the recording medium by retarding the abrasion in the neighborhood of the reproducing element or/and recording element 22. And, recording and reproducing resolution can be retarded from being degraded. A lubricating layer on the side of a recording medium can also be retarded from being abraded.

The abrasion retarding effect in the neighborhood of the reproducing element or/and recording element 22 is remarkable when a flat yoke type recording/reproducing part (or a flat yoke type reproducing part) is applied to the reproducing element or/and recording element 22. In the flat yoke type recording/reproducing part shown in FIG. 3, one main surface of the magnetic yoke 34 is substantially parallel to a magnetic flux flowing from a recording medium to the magnetic core 31 on one side, the MR film 36, and the magnetic core 32 on the other side. In other words, a magnetic flux flows substantially in parallel to the surface direction of the MR film 36. Therefore, the reproducing element or/and recording element 22 is exposed on the medium opposed face (ABS) to a small thickness of about 10 to 50 $\mu$m and its abrasion proceeds readily. In a shield type reproducing part, a magnetic flux flows substantially perpendicular to the surface direction of the MR film, and the reproducing element or/and recording element has a large thickness of about 200 $\mu$m. The present invention can effectively retard the flat yoke type recording/reproducing part (or the flat yoke type reproducing part) having a thin exposed part to the medium opposed face (ABS) from being abraded.

Figure 7:
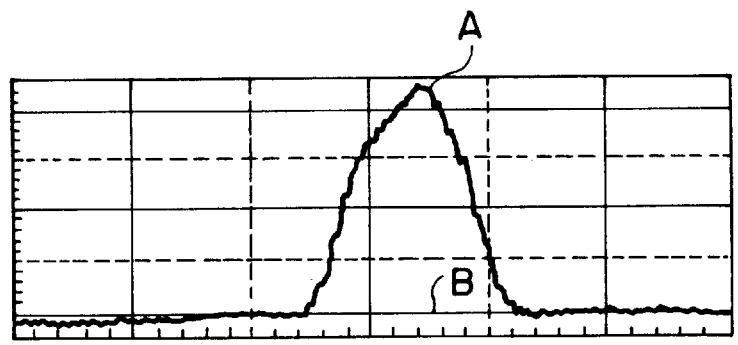
FIG. 7 is a characteristic view comparing the magnetic head (slider) according to the embodiment of the invention and a conventional magnetic head (slider)

FIG. 7 shows the result of observing the surface of a recording medium after running a magnetic head slider having a conventional flat yoke type reproducing part under a low flying height. It was found that a scratch shown in line A was formed on a lubricating material on the recording medium surface by the conventional magnetic head slider with the $AlO_x$ film, which is used as the protective insulation film or ABS protective film, exposed to the medium opposed face. On the other hand, since stability is improved and the ceramic substrates 25, 26 having a higher hardness than $AlO_x$ film are exposed to the medium opposed face in the magnetic head slider according to the embodiment of the invention, such scratch was not observed in line B.

The magnetic head (slider) 21 of the above embodiment has the reproducing element or/and recording element 22 disposed at about the center thereof in the direction of the recording track width. Therefore, a contacting frequency between the reproducing element or/and recording element 22 and the recording medium due to a mounting error of the head (slider) 54 to the actuator arm 56 can be reduced as compared with the conventional magnetic head (slider) having the reproducing element or/and recording element formed on one side face. Also, the reproducing element or/and recording element 22, which is disposed at about the center in the direction of recording track width and held between the ceramic substrates 25, 26 from its both sides, improves the running stability and tracing precision of the recording track. Such effects can be obtained easily by holding the reproducing element or/and recording element 22 between the ceramic substrates 25, 26 from its both sides.

By adopting a magnetic head slider to which the present invention is applied, a magnetic recording density can be enhanced, and a magnetic recording apparatus such as a magnetic disk drive having a high capacity and high reliability can be provided. The invention is particularly effective to run the magnetic head slider with a low flying height d of 100 nm or below.

Figure 13:
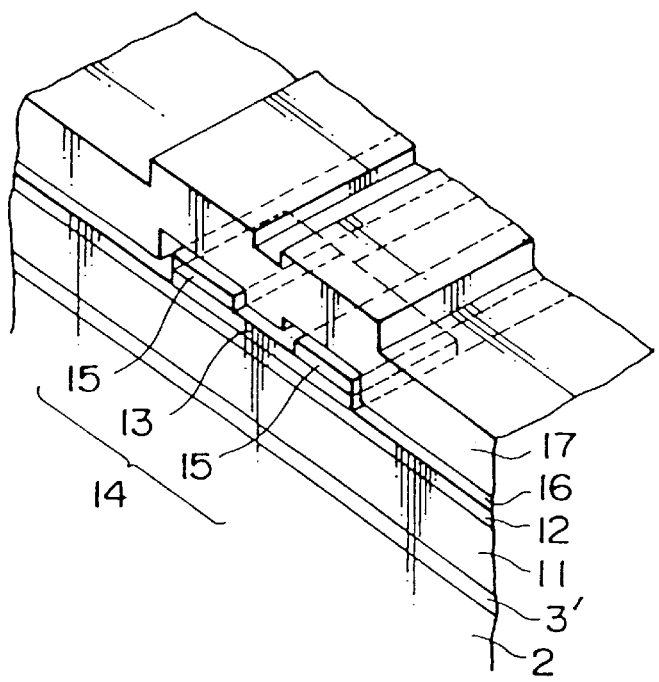
FIG. 13 is a perspective view showing the structure of a sealed type MR head as the reproducing element of a conventional magnetic head.

The invention can also apply various types reproducing parts and recording parts such as a shield type reproducing part (or a shield type recording/reproducing part) as shown in FIG. 13.

Figure 8:
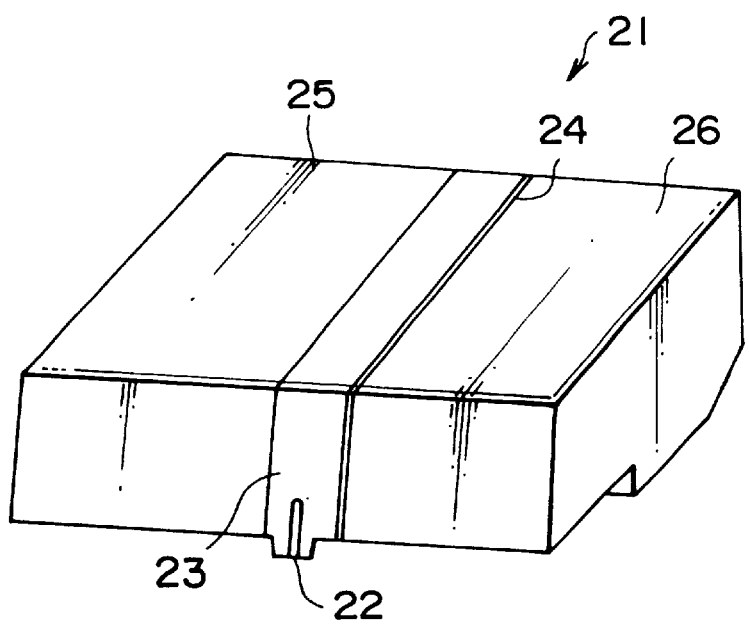
FIG. 8 is a perspective view showing a modification of the magnetic head (slider) shown in FIG. 1.

FIG. 8 is a perspective view showing the schematic structure of a modification of the magnetic head (slider) 21 shown in FIG. 1. In the magnetic head (slider) 21 shown in FIG. 8, the reproducing element or/and recording element 22 and the insulation layer 23 formed of $AlO_x$ or the like are exposed to the medium opposed face (ABS) in the neighborhood of the reproducing element or/and recording element 22. By the above head structure, heat dispersion in the neighborhood of the reproducing element or/and recording element 22 can also be improved. But, since abrasion in the neighborhood of the reproducing element or/and recording element 22 tends to be substantial, the magnetic head slider 21 shown in FIG. 1 is better in view of the abrasion resistance. The magnetic head (slider) 21 shown in FIG. 8 can effectively use diamond-like carbon for the insulation layer 23. Thus, abrasion in the neighborhood of the reproducing element or/and recording element 22 can be retarded.

Now, description will be made of the flat yoke type recording/reproducing part as the reproducing element or/and recording element 22 shown in the above embodiment and a method for producing the magnetic head (slider) 21 having the same. Referring to FIG. 9A through FIG. 9E, a production step for the flat yoke type recording/reproducing part as the reproducing element or/and recording element 22 will be described first.

Figure 9A:
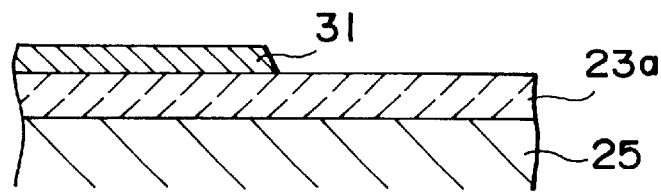
FIG. 9A, FIG. 9B, FIG. 9C, FIG. 9D, and FIG. 9E are sectional views showing a production process for the flat yoke type recording/reproducing element applied to the magnetic head (slider) shown in FIG. 1.

As shown in FIG. 9A, an insulation film 23$a$ such as an $AlO_x$ ($1 \leq x \leq 1.5$) film is formed on the surface of a first ceramic substrate 25 by a bipolar RF diode sputtering technique or the like. Then, a soft magnetic film of NiFe or CoZrNb is formed on the insulation film 23$a$, and a first magnetic core (yoke half) 31 is formed by ion beam etching using a resist mask.

Figure 9B:
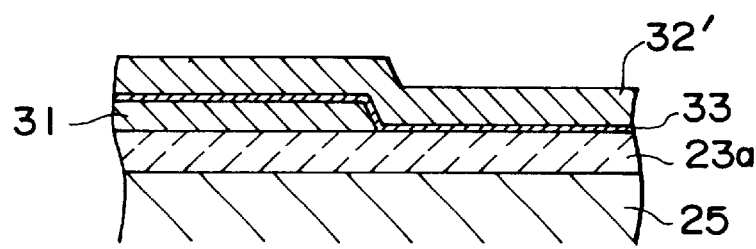
Figure 9C:
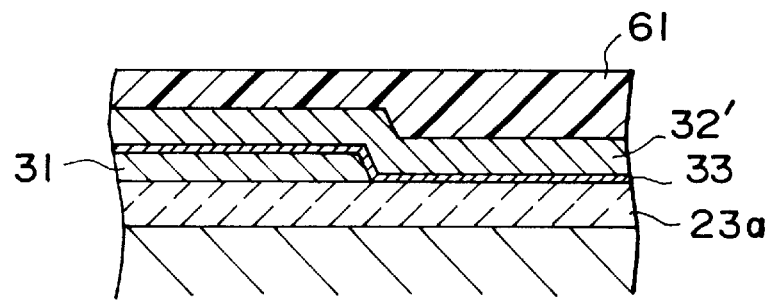

Then, as shown in FIG. 9B, a nonmagnetic film of $AlO_x$ or SiOx which becomes a magnetic gap 33 and a soft magnetic film 32' of NiFe or CoZrNb which becomes a second magnetic core 32 are successively formed on the insulation film 23$a$ and the first magnetic core 31. And, as shown in FIG. 9C, a resist 61 having a small molecular weight is applied and baked to make its surface flat.

Figure 9D:
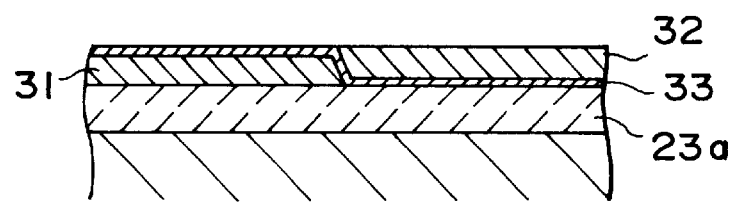

Then, as shown in FIG. 9D, an ion incident angle is determined so that the resist 61 and the soft magnetic film 32' are etched at the same etching rate. Under the conditions described above, etching is performed by an ion beam to expose the magnetic gap 33 on the first magnetic core 31, thereby forming the second magnetic core 32.

Figure 9E:
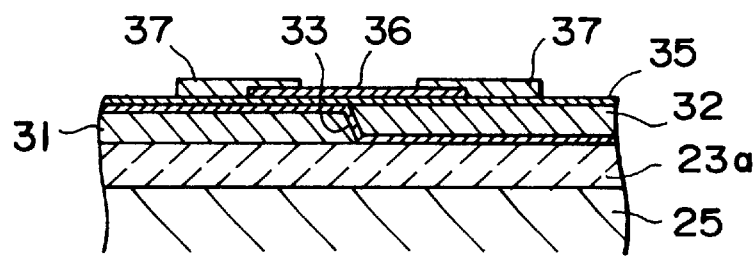

And, as shown in FIG. 9E, an insulation film 35 of $AlO_x$ or the like is formed on the surfaces of the first and second magnetic cores 31, 32, and an MR film 36 and a pair of electrodes 37 continued from its both ends are formed. Thus, the reproducing element or/and recording element 22 having a flat yoke type reproducing part is completed. Also, the back core 40 and the recording coil 41 (not shown in FIG. 9E) are formed behind the MR film 36, and their surfaces are covered with a protective insulation film to complete the reproducing element or/and recording element 22 having the flat yoke type recording/reproducing part. This reproducing element or/and recording element 22 is a film having a thickness of about 10 to 50 μm.

The recording part can also be configured by forming a pair of magnetic poles independent of the flat yoke of the reproducing part. In this case, the flat yoke part of the reproducing part and the magnetic poles of the recording part can be formed into a laminated structure with a nonmagnetic insulation film therebetween.

Now, a process for producing the magnetic head (slider) using the flat yoke type recording/reproducing element 22 will be described with reference to FIG. 10A through FIG. 10C.

Figure 10A:
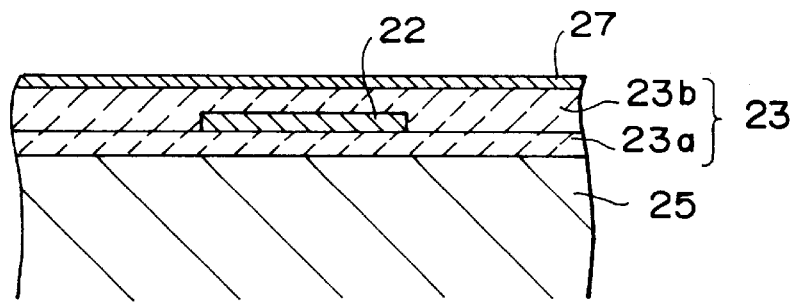
FIG. 10A, FIG. 10B, and FIG. 10C are sectional views showing a production process of the magnetic head (slider) shown in FIG. 1.
Figure 10B:
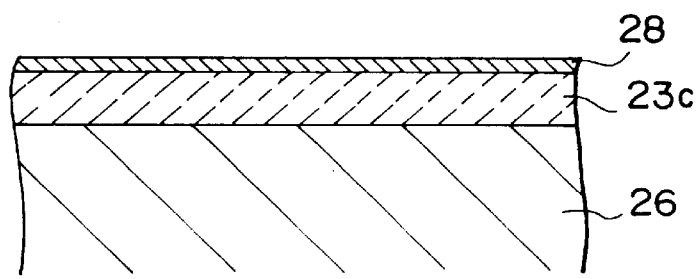

As shown in FIG. 10A, the protective insulation film 23$b$ of $AlO_x$ or the like is formed on the surface of the first ceramic substrate 25 on which the reproducing element or/and recording element 22 is formed by a bipolar RF diode sputtering technique or the like, and the formed surface is made flat by polishing or the like. The reproducing element or/and recording element 22 is disposed inside the insulation layer 23. Then, a passivation film or a bonding base film 27 of a material highly adherent to a bonding material to be used afterward, e.g., Ti, is formed on the flattened surface of the insulation layer 23.

Meanwhile, as shown in FIGg. 10B, the second ceramic substrate 26 is prepared to form the same bonding base film 28 on its surface. The second ceramic substrate 26 may have the insulation layer 23$c$ on the surface.

Figure 10C:
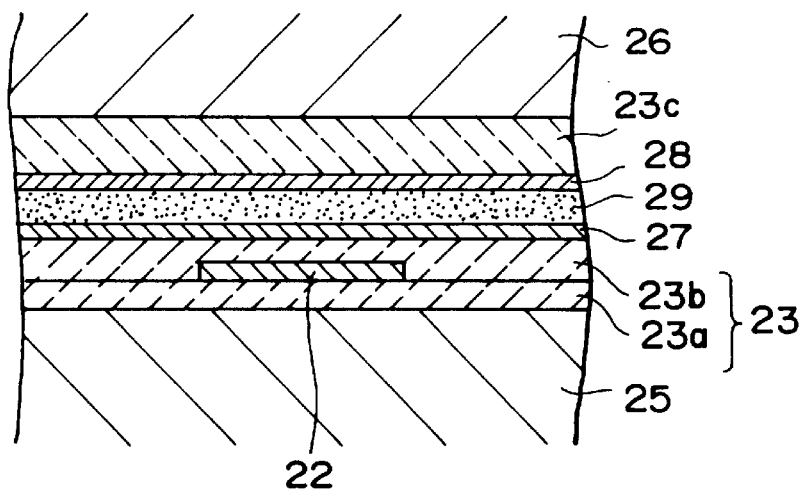

Then, as shown in FIG. 10C, the first ceramic substrate 25 and the second ceramic substrate 26 are laminated with the adhesive layer 29 of water glass, low melting glass or the like placed between the bonding base films 27, 28. In this state, thermal treatment is performed at about 300° C. to bond the first ceramic substrate 25 and the second ceramic substrate 26. The bonded substrate body is cut to expose the reproducing element or/and recording element 22 to the medium opposed face (ABS) and fabricated into the form of a head slider, thereby achieving the magnetic head slider 21 of the embodiment.

A preferable combination of the bonding base film 28 and the adhesive layer 29 includes a Ti/Si/adhesive layer, an Si/adhesive layer, an Si/$SiO_x$/adhesive layer, a Ti/Si/$SiO_x$/adhesive layer and others. Si and $SiO_x$ are highly adherent to Ti and the like, and also to water glass and the like. Cr, Nb, Ta, Zr and a mixed layer thereof can be used instead of Ti.

For bonding preferably, a magnetostatic field of the order of several volts is preferably applied to the ceramic substrates while heating. The heating temperature is preferably in the order of 250 to 320° C. when the used MR film is formed of a low heat-resistant material such as $Ni_{80}Fe_{20}$ or the like. Bonding to a relatively high heat-resistant material such as $Co_{90}Fe_{10}/Cu/Co_{90}Fe_{10}$ can be made at about 250 to 350° C. Where water glass or the like is used as the adhesive layer 29, a relatively high heat-resistant material such as $Co_{90}Fe_{10}/Cu/Co_{90}Fe_{10}$ is preferably used because a heat treating temperature in the order of 250 to 350° C. is required.

In addition to the water glass or the like, the adhesive layer 29 can be made of inert metal, e.g., Au, Pt, Ag, Cu, Ni, Ir, Co or the like.

To bond by using the inert metal, an inert metal film is formed on the surfaces of the bonding base metals 27, 28 of the ceramic substrates 25, 26 by a sputtering technique. The inert metal film is preferably formed with a chamber interior kept under vacuum or the chamber atmosphere in a reducing atmosphere of hydrogen or the like. The inert metal film formed as described above does not have any oxide on its surface and has a good bonding property. Then, the first and second ceramic substrates 25, 26 are laminated with the inter metal films opposed each other. In this laminated state, they are heated to 250 to 350° C. to adhere the first ceramic substrate 25 and the second ceramic substrate 26.

Bonding using the inert metal can be performed at a temperature in the order of 250 to 350° C., and even when the reproducing element or/and recording element has a thin film magnetic head poor in heat resistance, the magnetic property of the thin film magnetic head is not degraded. Especially, platinum group elements such as Pt. Rh, Ru, Pd, Os and Ir have a high Vickers hardness and an effect of retarding abrasion. Also, they have a thermal conductivity higher than a glass-based adhesive agent, so that a heat dissipating efficiency from the reproducing element or/and recording element 22 to the second ceramic substrate 26 can be improved.

Figure 11:
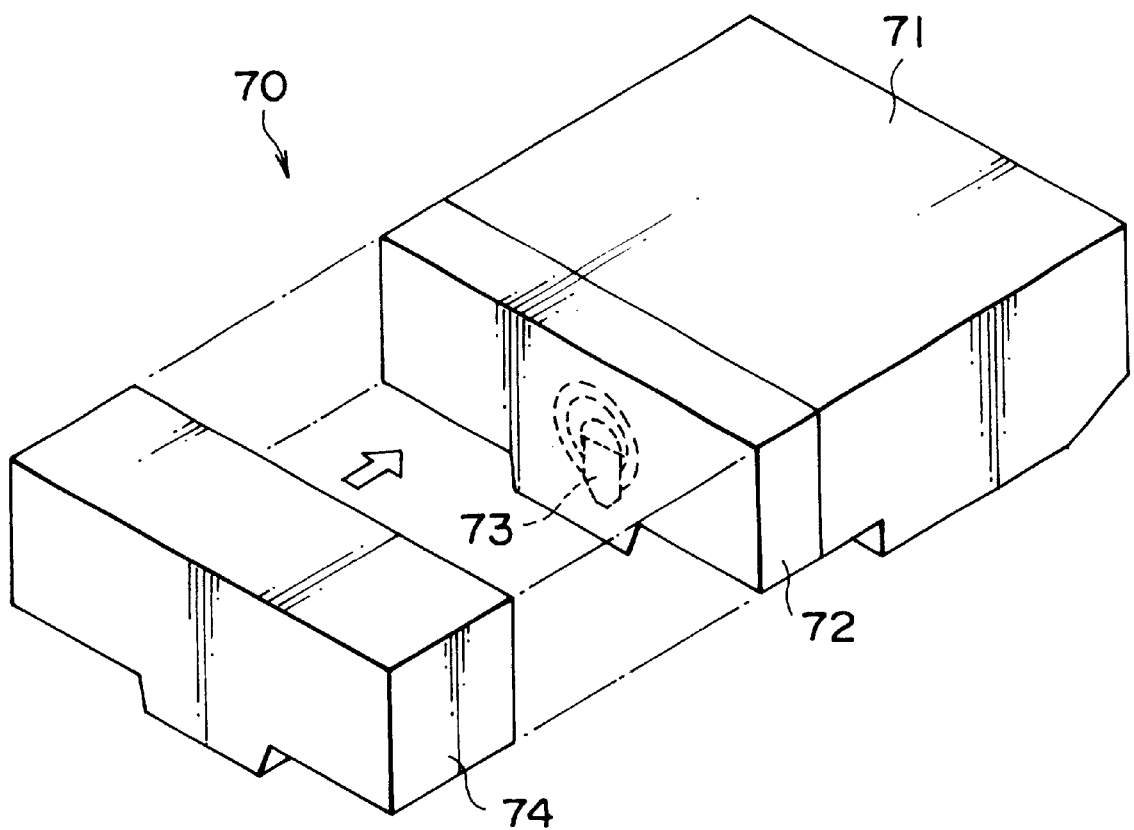
FIG. 11 is a perspective view schematically showing the magnetic head (slider) according to a second embodiment of the invention.

Now, description will be made of a second embodiment of a magnetic head (slider) to which the thin film magnetic head of the invention is applied. FIG. 11 is a perspective view showing a schematic structure of the second embodiment of a magnetic head slider to which the thin film magnetic head of the invention is applied.

A magnetic head (slider) 70 shown in FIG. 11 has a first ceramic substrate 71 which has on its main surface an insulation layer 71 made of $AlO_x$ ($1 \leq x \leq 1.5$) or the like. A reproducing element or/and recording element 73 is embedded into the insulation layer 72. The reproducing element or/and recording element 73 is formed at substantially the center in the direction of recording track width. And, the first ceramic substrate 71 which has the reproducing element or/and recording element 73 disposed inside the insulation layer 72 and the second ceramic substrate 74 are adhered into a laminated structure to be parallel to a direction that the medium is forwarded, thereby forming the magnetic head (slider) 70.

Specifically, the reproducing element or/and recording element 73 disposed inside the insulation layer 72 is held from the direction of its thickness between the first ceramic substrate 71 and the second ceramic substrate 74. In other words, the first and second ceramic substrates 71, 74 hold the reproducing element or/and recording element 73, which is disposed inside the insulation layer 72, from the direction that the medium is forwarded. The reproducing element or/and recording element 73 is previously formed on the first ceramic substrate 71 so to locate at substantially the center in the direction of recording track width.

In the second embodiment, the material and bonding method of the ceramic substrates 71, 74, and the structure of the reproducing element or/and recording element 73 are preferably the same as in the first embodiment described above.

In the magnetic head (slider) 70 of the second embodiment, heat generated from the reproducing element or/and recording element 73 can be dissipated efficiently to the first ceramic substrate 71 and the second ceramic substrate 74. Especially, by positioning the reproducing element or/and recording element 73 at substantially the center in the direction of recording track width, the heat dissipating efficiency can be improved furthermore. Abrasion in the neighborhood of the reproducing element or/and recording element 73 can be retarded by the structure that the first and second ceramic substrates 71, 74 are exposed to the medium opposed face in the neighborhood of the reproducing element or/and recording element 73. Furthermore, by disposing the reproducing element or/and recording element 73 at substantially the center in the direction of recording track width, running stability and trace precision of the recording track can be improved.

As described above, the present invention can efficiently dissipate heat which is produced due to the contact between the thin film magnetic head, which is running with a low flying height, and any projections on the surface of a medium. Therefore, disadvantages such as a thermal asperity can be reduced. Even when the flying level is not higher than a smoothing limit of a recording medium, the reproducing/recording resolution can be retarded from being degraded. Besides, the medium opposed face of the thin film magnetic head can be retarded from being abraded. The lubricating layer of the recording medium can also be retarded from being abraded involved in the abrasion of the thin film magnetic head.

What is claimed is:

1. A thin film magnetic head, comprising:
   a first ceramic substrate having a high thermal conductivity;
   a second ceramic substrate having a high thermal conductivity; and
   a transferring element having a magnetoresistance effect element being held between the first ceramic substrate and the second ceramic substrate from its thickness direction so as to position the transferring element at substantially the center of the thin film magnetic head in a direction of a track width defined in accordance with the transferring element,
   wherein the direction of the track width is substantially perpendicular to the direction of travel of a medium relative to the magnetic head when the transferring element transfers information, and wherein the first and second ceramic substrates are disposed on respective sides of the transferring element such that the first and second ceramic substrates dissipate heat from the transferring element.

2. The thin film magnetic head as set forth in claim 1, wherein at least one of the first ceramic substrate and the second ceramic substrate is formed of a ceramic substrate having a thermal conductivity from 10 W/mK to 270 W/mK.

3. The thin film magnetic head as set forth in claim 1, wherein at least one of the first ceramic substrate and the second ceramic substrate is formed of a ceramic substrate having a Vickers hardness from 800 Hv to 3000 Hv.

4. The thin film magnetic head as set forth in claim 1, wherein the magnetoresistance effect element has a magnetoresistance effect film having a Co-based magnetic layer and a Cu-based nonmagnetic layer facing each other.

5. The thin film magnetic head as set forth in claim 1, wherein the transferring element is disposed within an insulation layer, the insulation layer being held between the first and second ceramic substrates.

6. The thin film magnetic head as set forth in claim 5, wherein at least one of the first ceramic substrate and the second ceramic substrate has a thermal conductivity higher than that of the insulation layer.

7. The thin film magnetic head as set forth in claim 6, wherein the transferring element is formed on the first ceramic substrate, and the insulation layer and the second ceramic substrate are adhered with a bonding layer of an inorganic material therebetween.

8. The thin film magnetic head as set forth in claim 7, wherein the bonding layer has an adhesive layer of inert metal.

9. The thin film magnetic head as set forth in claim 1, wherein the magnetoresistance effect element has a giant magnetoresistance effect film.

10. The thin film magnetic head as set forth in claim 1, wherein the transferring element includes a recording element having a flat coil.

11. A thin film magnetic head, comprising:
a first ceramic substrate having a high thermal conductivity;
a second ceramic substrate having a high thermal conductivity; and
a transferring element having a magnetoresistance effect element being held between the first ceramic substrate and the second ceramic substrate substantially in a direction of a track width defined in accordance with the transferring element,
wherein the direction of the track width is substantially perpendicular to the direction of travel of a medium relative to the magnetic head when the transferring element transfers information, and wherein the first and second ceramic substrates are disposed on respective sides of the transferring element such that the first and second ceramic substrates dissipate heat from the transferring element.

12. The thin film magnetic head as set forth in claim 11, wherein the transferring element is positioned at substantially the center of the thin film magnetic head with respect to the direction of the track width.

13. The thin film magnetic head as set forth in claim 11, wherein at least one of the first ceramic substrate and the second ceramic substrate is formed of a ceramic substrate having a thermal conductivity from 10 W/mK to 270 W/mK.

14. The thin film magnetic head as set forth in claim 11, wherein at least one of the first ceramic substrate and the second ceramic substrate is formed of a ceramic substrate having a Vickers hardness from 800 Hv to 3000 Hv.

15. The thin film magnetic head as set forth in claim 11, wherein the transferring element is disposed within an insulation layer, the insulation layer being held between the first and second ceramic substrates.

16. The thin film magnetic head as set forth in claim 15, wherein at least one of the first ceramic substrate and the second ceramic substrate has a thermal conductivity higher than that of the insulation layer.

17. The thin film magnetic head as set forth in claim 16, wherein the transferring element is formed on the first ceramic substrate, and the insulation layer and the second ceramic substrate are adhered with a bonding layer of an inorganic material therebetween.

18. The thin film magnetic head as set forth in claim 11, wherein the magnetoresistance effect element has a giant magnetoresistance effect film.

19. The thin film magnetic head as set forth in claim 11, wherein the transferring element includes a recording element having a flat coil.

20. A thin film magnetic head, comprising:
a transferring element which has at least one pair of magnetic cores with a magnetic gap therebetween formed on the side of a medium opposed surface and a magnetoresistance effect element to which a signal magnetic flux is led from a recording medium through the pair of magnetic cores; and
first and second ceramic substrates which hold the transferring element in its thickness direction and have a high thermal conductivity,
wherein the thickness direction is a direction substantially perpendicular to the direction of travel of a medium relative to the magnetic head when the transferring element transfers information, and wherein the first and second ceramic substrates are disposed on respective sides of the transferring element such that the first and second ceramic substrates dissipate heat from the transferring element.

21. The thin film magnetic head as set forth in claim 20, wherein transferring element has a flat coil to supply the pair of magnetic cores with a recording magnetic field.

22. The thin film magnetic head as set forth in claim 20, wherein the transferring element is positioned at substantially the center of the thin film magnetic head with respect to a direction of a track width defined in accordance with the transferring element.

23. The thin film magnetic head as set forth in claim 20, wherein at least one of the first ceramic substrate and the second ceramic substrate is formed of a ceramic substrate having a thermal conductivity of from 10 W/mK to 270 W/mK.

24. The thin film magnetic head as set forth in claim 20, wherein at least one of the first ceramic substrate and the second ceramic substrate is formed of a ceramic substrate having a Vickers hardness of from 800 Hv to 3000 Hv.

25. The thin film magnetic head as set forth in claim 20, wherein the transferring element is disposed within an insulation layer, the insulation layer being held between the first and second ceramic substrates.

26. The thin film magnetic head as set forth in claim 25, wherein at least one of the first ceramic substrate and the second ceramic substrate has a thermal conductivity higher than that of the insulation layer.

27. The thin film magnetic head as set forth in claim 26, wherein the transferring element is formed on the first ceramic substrate, and the insulation layer and the second ceramic substrate are adhered with a bonding layer of an inorganic material therebetween.

28. The thin film magnetic head as set forth in claim 20, wherein the track width is defined by a thickness of the magnetic core.

29. The thin film magnetic head as set forth in claim 20, wherein the magnetoresistance effect element has a giant magnetoresistance effect film.

30. A magnetic recording apparatus, comprising:
a magnetic recording medium; and
a magnetic head slider having a thin film magnetic head which includes
a first ceramic substrate having a high thermal conductivity,
a second ceramic substrate having a high thermal conductivity, and
a transferring element having a magnetoresistance effect element, said transferring element being held between the first ceramic substrate and the second ceramic substrate from the direction of its thickness so as to position the transferring element at substantially the center of the magnetic head slider in a direction of a track width of the magnetic recording medium defined in accordance with the transferring element,
wherein the direction of the track width is substantially perpendicular to the direction of travel of a medium relative to the magnetic head when the transferring element transfers information, and wherein the first and second ceramic substrates are disposed on respective sides of the transferring element such that the first and second ceramic substrates dissipate heat from the transferring element.

31. The magnetic recording apparatus as set forth in claim 30, wherein the magnetic head slider has a flying height of 100 nm or below above the magnetic recording medium.

32. The magnetic recording apparatus as set forth in claim 30, wherein the transferring element is disposed within an insulation layer, the insulation layer being held between the first and second ceramic substrates.

33. The magnetic recording apparatus as set forth in claim 32, wherein at least one of the first ceramic substrate and the second ceramic substrate has a thermal conductivity higher than that of the insulation layer.

34. The magnetic recording apparatus as set forth in claim 30, wherein the magnetoresistance effect element has a giant magnetoresistance effect film.

35. The magnetic recording apparatus as set forth in claim 30, wherein the transferring element writes signals in the magnetic recording medium by a magnetic field.

36. The magnetic recording apparatus as set forth in claim 35, wherein the transferring element includes a recording element having a flat coil.

37. The magnetic recording apparatus set forth in claim 30, wherein the magnetic recording medium is a hard disk.

38. A magnetic recording apparatus, comprising:
  a magnetic recording medium; and
  a magnetic head slider having a thin film magnetic head which includes
    a first ceramic substrate having a high thermal conductivity,
    a second ceramic substrate having a high thermal conductivity, and
    a transferring element having a magnetoresistance effect element, the transferring element being held between the first ceramic substrate and the second ceramic substrate in a direction of a track width of the magnetic recording medium defined in accordance with the transferring element,
  wherein the direction of the track width is substantially perpendicular to the direction of travel of a medium relative to the magnetic head when the transferring element transfers information, and wherein the first and second ceramic substrates are disposed on respective sides of the transferring element such that the first and second ceramic substrates dissipate heat from the transferring element.

39. The magnetic recording apparatus as set forth in claim 38, wherein the transferring element is positioned at substantially the center of the thin film magnetic head with respect to the direction of the track width.

40. The magnetic recording apparatus set forth in claim 39, wherein the magnetic recording medium is a hard disk.

41. The magnetic recording apparatus as set forth in claim 38, wherein the magnetic head slider has a flying height of 100 nm or below above the magnetic recording medium.

42. The magnetic recording apparatus as set forth in claim 38, wherein the transferring element is disposed within an insulation layer, the insulation layer being held between the first and second ceramic substrates.

43. The magnetic recording apparatus as set forth in claim 42, wherein at least one of the first ceramic substrate and the second ceramic substrate has a thermal conductivity higher than that of the insulation layer.

44. The magnetic recording apparatus as set forth in claim 38, wherein the magnetoresistance effect element has a giant magnetoresistance effect film.

45. The magnetic recording apparatus as set forth in claim 38, wherein the transferring element writes signals in the magnetic recording medium by a magnetic field.

46. The magnetic recording apparatus as set forth in claim 45, wherein the transferring element includes a recording element having a flat coil.

47. A magnetic recording and reproducing apparatus, comprising:
  a magnetic recording medium; and
  a magnetic head slider having a thin film magnetic head which includes
    a transferring element having a magnetoresistance effect element for reading signals from the magnetic recording medium and a recording element for writing signals in the magnetic recording medium by a magnetic field, the transferring element having a pair of magnetic cores formed on the side of a medium opposed surface with a magnetic gap therebetween from which a signal magnetic flux from the magnetic recording medium is led through the pair of magnetic cores to the magnetoresistance effect element, and
    first and second ceramic substrates which hold the transferring element in its thickness direction and have a high thermal conductivity,
  wherein the thickness direction is a direction substantially perpendicular to the direction of travel of a medium relative to the magnetic head when the transferring element reads signals, and wherein the first and second ceramic substrates are disposed on respective sides of the transferring element such that the first and second ceramic substrates dissipate heat from the transferring element.

48. The magnetic recording and reproducing apparatus as set forth in claim 47, wherein the transferring element has a flat coil to supply the pair of magnetic cores with a recording magnetic field.

49. The magnetic recording and reproducing apparatus as set forth in claim 47, wherein the transferring element is positioned at substantially the center of the thin film magnetic head with respect to a direction of a track width of the magnetic recording medium defined in accordance with the transferring element.

50. The magnetic recording and reproducing apparatus set forth in claim 49, wherein the magnetic recording medium is a hard disk.

51. The magnetic recording and reproducing apparatus as set forth in claim 47, wherein the magnetic head slider has a flying height of 100 nm or below above the magnetic recording medium.

52. The magnetic recording and reproducing apparatus as set forth in claim 47, wherein the transferring element is disposed within an insulation layer, the insulation layer being held between the first and second ceramic substrates.

53. The magnetic recording and reproducing apparatus as set forth in claim 52, wherein at least one of the first ceramic substrate and the second ceramic substrate has a thermal conductivity higher than that of the insulation layer.

54. The magnetic recording and reproducing apparatus as set forth in claim 47, wherein the magnetoresistance effect element has a giant magnetoresistance effect film.

* * * * *